United States Patent Office 3,057,803
Patented Oct. 9, 1962

3,057,803
HYDRAULIC FLUIDS WITH POLYMERIC VISCOSITY INDEX IMPROVERS
Rudi Otto Benz, Weiterstadt, and Ernst Koch, Traisa, Germany, assignors to Rohm & Haas G.m.b.H., Darmstadt, Germany
No Drawing. Filed Apr. 9, 1959, Ser. No. 805,129
Claims priority, application Germany Apr. 12, 1958
8 Claims. (Cl. 252—78)

This invention relates to hydraulic fluids or liquids having improved characteristics and to a process for preparing the same.

Fluids presently employed in hydraulic systems, such as hydraulic brake systems, and the like, are based on a variety of liquid chemical compounds, including mineral oil, castor oil, various glycols, chlorinated diphenyls, triaryl phosphates and certain alcohols, such as n-propyl and isopropyl alcohol. Also various materials are employed as additives to the basic liquids to improve the characteristics thereof. For example, triethanolamine may be incorporated to prevent corrosion of the metal parts of the system. Diacetone alcohol (dimethylacetonyl carbinol) is sometimes used as a component for castor oil base hydraulic brake fluids to reduce the viscosity of the fluids and to minimize the effect of low temperatures on the viscosity.

The viscosity and the viscosity index of hydraulic fluids are important characteristics which must, at times, be controlled through the use of additives. Generally speaking, a fluid of high viscosity index is desirable, in that it undergoes a comparatively slight change of viscosity with change in temperature.

Salts of polymerized acrylic acids have been used as additives in those hydraulic fluids not based on mineral oil, to increase the viscosity of the fluid and to improve the viscosity-temperature behavior or viscosity index of such fluids. Generally speaking, however, the polyacrylates employed up to now have a disadvantage of leaving hard and adhering residues in the hydraulic system when the basis liquid evaporates.

It has now been found that the viscosity and viscosity index of hydraulic fluids not based on mineral oil may be satisfactorily controlled without the disadvantage of the above-mentioned undesirable residues by incorporation, in the fluid of polymers of alkylene glycol ethers, the free hydroxyl groups of which are esterified with a polymerizable monocarboxylic acid. These additives are particularly effective in improving the viscosity-temperature behavior of hydraulic fluids based upon alkylene glycols and triaryl phosphates.

The monomers which are used in preparing the polymers of this invention or ether esters of alkylene glycols, preferably of ethylene or propylene glycols. One or a number of alkylene glycol units may be contained in a molecule. In general, however, not more than ten alkylene glycol units may be placed adjoining each other under mutual etherification of the hydroxyl groups. One terminal hydroxyl group of the glycol is etherified, while the other terminal hydroxyl group is esterified with a polymerizable monocarboxylic acid such as acrylic acid or an alpha-substituted acrylic acid. The ether residues preferably consist of straight or branched chain alkyl compounds, but cyclic alkyl, aryl and aralkyl groups may also be employed.

Examples of the compounds of this invention include methacrylic acid diethylene glycol butyl ether, $C_4H_9$—$OCH_2CH_2OCH_2CH_2OOC.C(CH_3):CH_2$ acrylic acid tetraethylene glycol dodecyl ether,

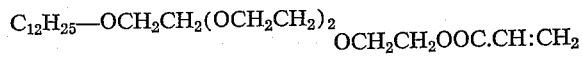

and methacrylic acid propylene glycol hexyl ether,

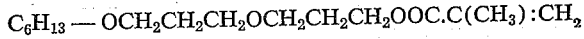

The polymers which may be used in accordance with this invention may be obtained according to conventional processes. Furthermore, the polymers of this invention may be co-polymerized with additional monomeric polymerizable vinyl and arcylic compounds such as metachrylamide, beta-dimethyl aminoethyl methacrylate, and methacrylic acid and/or vinyl ethers, such as vinyl-butyl-ether providing that the solubility of the co-polymer is maintained in the same range as that of the polymers described above.

In order to improve the viscosity behavior of the hydraulic fluids of this invention, the polymeric alkylene-oxide-ether esters are preferably added as a solution of the ester in a polyalkylene glycol ether such as diethylene glycol ethyl ether.

In many cases, the addition of less than 10%, preferably from 4 to 6%, of a 50% solution of the polymer or co-polymer by weight in the polyalkylene glycol ether has proved effective. The percentage of the additive solution is based on the weight of the hydraulic fluid.

The following examples are submitted to illustrate, but not to limit, the subject matter of the present invention.

EXAMPLE 1

A co-polymer having 90 parts of the methacrylic acid ester of diethylene glycol butyl ether and 10 parts of methacrylic acid methyl ester was prepared by conventional solvent polymerization techniques, using diethylene glycol ether as a solvent. A 50% solution of the co-polymer in diethylene glycol ethyl ether was added to the hydraulic fluids listed in Tables 1 and 2 below in the amounts indicated and the viscosity index values for each of the solutions was determined. The values are indicated in the tables.

TABLE 1

*The Viscosity Index Improvement Obtained by Adding the Solution of Copolymer Prepared Above to a Hydraulic Fluid Containing Diethylene Glycol Monoethyl Ether, Diethylene Glycol Monomethyl Ether, Diethylene Glycol Monobutyl Ether and Triethylene Glycol Monobutyl Ether*

| Composition | Viscosity | | | Behavior at Low Temperatures | |
|---|---|---|---|---|---|
| | cSt | | Viscosity Index [1] | Turbidity Point, °C. | Solidification Point, °C. |
| | 100° F. | 210° F. | | | |
| Pure hydraulic fluid | 17.9 | 3.74 | 108 | −43 | −60 |
| Hydraulic fluid +2% of copolymer solution of Example 1 | 20.67 | 4.39 | 142 | −43 | −60 |
| Hydraulic fluid +4% of copolymer solution of Example 1 | 22.62 | 4.98 | 158 | −43 | −60 |
| Hydraulic fluid +6% of copolymer solution of Example 1 | 25.23 | 5.56 | 161 | −43 | −60 |

[1] According to ASTM D 567–53.

TABLE 2

*The Viscosity Index Improvement Obtained by Adding the Solution of Copolymer Prepared Above to a Hydraulic Fluid Based on Trixylenyl Phosphate*

| Composition | Viscosity | | | Behavior at Low Temperatures | |
|---|---|---|---|---|---|
| | cSt | | Viscosity Index | Turbidity Point, °C. | Solidification Point, °C. |
| | 100° F. | 210° F. | | | |
| Pure trixylenyl Phosphate | 49.9 | 5.18 | −27 | | −26 |
| Trixylenyl phosphate +2% of copolymer solution prepared above | 56.2 | 6.22 | +45 | | −26 |
| Trixylenyl phosphate +4% of copolymer solution prepared above | 63.2 | 7.40 | 83 | | −26 |
| Trixylenyl phosphate +6% of copolymer solution prepared above | 67.6 | 8.28 | 100 | | −26 |
| Trixylenyl phosphate +8% of copolymer solution prepared above | 80.5 | 10.16 | 114 | | −26 |
| Trixylenyl phosphate +10% of copolymer solution prepared above | 86.6 | 11.30 | 121 | | −26 |

EXAMPLE 2

A copolymer consisting of 70 parts of methacrylic acid ester of diethylene glycol butyl ether and 30 parts of methacrylic acid methyl ester in sufficient diethylene glycol ethyl ether to form a 50% solution of the copolymer was prepared according to the process set forth in Example 1. The addition of 4% of this solution to a hydraulic fluid consisting of diethylene glycol monoethyl ether, diethylene glycol monomethyl ether, diethylene glycol monobutyl ether, and triethylene glycol monobutyl ether, the percentage being based on the weight of the hydraulic fluid, gave the following results:

TABLE 3

| cSt | | Viscosity Index |
|---|---|---|
| 100° F. | 210° F. | |
| 24.12 | 5.28 | 159 |

EXAMPLE 3

A copolymer having 90 parts of the methacrylic acid ester of an alkyl phenol polyglycol ether known commercially as "Marlophen 85" and 10 parts of methacrylic acid methyl ester in sufficient diethylene glycol ethyl ether to prepare a 50% solution was prepared according to the process set forth in Example 1. Addition of 4% of this solution to the hydraulic fluid of Table 1 gave the following results:

| cSt | | Viscosity Index |
|---|---|---|
| 100° F. | 210° F. | |
| 21.48 | 4.56 | 146 |

It is understood that the foregoing examples are illustrative only and that modifications will occur to those skilled in the art. Therefore, the invention is not to be limited thereto but is to be defined by the appended claims.

We claim:

1. An improved synthetic oil base hydraulic fluid consisting essentially of a base fluid having a viscosity suitable for use in hydraulic systems and selected from the group consisting of polyalkylene glycol alkyl ethers and triaryl phosphates, and an amount effective to increase the viscosity of said oil of a copolymer of a minor amount of (A) at least one monomeric polymerizable compound from the group consisting of methacrylic acid, methyl methacrylate, methacrylamide, beta dimethyl aminoethyl methacrylate and vinyl butyl ether with a major amount of (B) an ester of an acid of the group consisting of acrylic acid and methacrylic acid with an alkylene glycol hydrocarbon ether containing not more than ten adjacent alkylene glycol units wherein said alkylene glycol units contain from 2 to 3 carbon atoms and wherein the hydrocarbon radical is selected from the group consisting of straight and branched chain alkyl, cyclic alkyl, aryl and aralkyl groups having a carbon chain length of from about 4 to about 12.

2. A hydraulic fluid consisting essentially of a base fluid having a viscosity suitable for use in hydraulic systems and selected from the group consisting of polyalkylene glycol alkyl ethers and triaryl phosphates, and an amount effective to increase the viscosity index of said base fluid of a polymer obtained by polymerizing an alkylene glycol hydrocarbon ether containing not more than ten adjacent alkylene glycol units wherein said alkylene glycol units contain from 2 to 3 carbon atoms and wherein the hydrocarbon radical is selected from the group consisting of straight and branched chain alkyl, cyclic alkyl, aryl and aralkyl groups having a carbon chain length of from 4 to about 12, the free terminal hydroxyl group of the ether being esterified with an acid from the group consisting of acrylic acid and methacrylic acid.

3. A hydraulic fluid consisting essentially of (1) a base fluid having a viscosity suitable for use in hydraulic systems selected from the group consisting of polyalkylene glycol alkyl ethers and triaryl phosphates, (2) diethylene glycol ethyl ether, and (3) an amount effective to increase the viscosity index of said base fluid of a polymer obtained by polymerizing an alkylene glycol hydrocarbon ether containing not more than ten adjacent alkylene glycol units wherein the said alkylene glycol units contain from 2 to 3 carbon atoms and wherein the hydrocarbon radical is selected from the group consisting of straight and branched chain alkyl, cyclic alkyl, aryl and aralkyl groups having a carbon chain length of from about 4 to about 12, the free terminal hydroxyl group of the ether being esterified with an acid from the group consisting of acrylic acid and methacrylic acid.

4. A hydraulic fluid consisting essentially of a polyalkylene glycol alkyl ether having a viscosity suitable for hydraulic systems as a base fluid, with diethylene glycol ethyl ether and an amount effective to increase the viscosity index of said base fluid of a polymerized acrylic acid ester of a hydrocarbon ether containing not more than ten adjacent alkylene glycol units wherein said alkylene glycol units contain from 2 to 3 carbon atoms and wherein the hydrocarbon radical is selected from the group consisting of straight and branched chain alkyl, cyclic alkyl, aryl and aralkyl groups having a carbon chain length of from about 4 to about 12.

5. A hydraulic fluid consisting essentially of a triaryl phosphate as the base fluid, with diethylene glycol ethyl ether and an amount effective to increase the viscosity index of said base fluid of a polymerized acrylic acid ester of an alkylene glycol hydrocarbon ether containing not more than ten adjacent alkylene glycol units wherein said alkylene glycol units contain from 2 to 3 carbon atoms and wherein the hydrocarbon radical is selected from the group consisting of straight and branched chain alkyl, cyclic alkyl, aryl and aralkyl groups having a carbon chain length of from about 4 to about 12.

6. A hydraulic fluid consisting essentially of a base fluid consisting of diethylene glycol monoethyl ether, diethylene glycol monomethyl ether, diethylene glycol monobutyl ether and triethylene glycol monobutyl ether and a viscosity-improving additive comprising a copolymer of (A) the methacrylic acid ester of diethylene glycol butyl ether and (B) methacrylic acid methyl ester, said copolymer being present in an amount sufficient to increase the viscosity index of said base fluid.

7. A hydraulic fluid consisting essentially of a polyalkylene glycol alkyl ether having a viscosity suitable for use in hydraulic systems, diethylene glycol ether, and a copolymer of a major amount of (A) the methacrylic acid ester of diethylene glycol butyl ether and a minor amount of (B) methacrylic acid methyl ester, said copolymer being present in an amount sufficient to increase the viscosity index of said hydraulic fluid.

8. A hydraulic fluid consisting essentially of trixylenyl phosphate, diethylene glycol ether and a copolymer of a major amount of (A) the methacrylic acid ester of diethylene glycol butyl ether and a minor amount of (B) methacrylic acid methyl ester, said copolymer being present in an amount sufficient to increase the viscosity index of said hydraulic fluid.

References Cited in the file of this patent

UNITED STATES PATENTS

| | | |
|---|---|---|
| 2,755,251 | Barker | July 17, 1956 |
| 2,870,195 | Heininger | Jan. 20, 1959 |
| 2,892,783 | Stuart et al. | June 30, 1959 |
| 2,892,816 | Lowe et al. | June 30, 1959 |

FOREIGN PATENTS

| | | |
|---|---|---|
| 768,690 | Great Britain | Feb. 20, 1957 |
| 770,771 | Great Britain | Mar. 27, 1957 |
| 787,057 | Great Britain | Nov. 27, 1957 |

OTHER REFERENCES

Glavis: "Polymeric Additives for Syn. Ester Lubes," Ind. and Engr. Chem., December 1950, vol. 42, No. 12, pages 2441–2446.